April 7, 1942.                J. B. STIMATZE                2,279,183
                       THREE ROW HARVESTING MACHINE
                 Filed March 20, 1941         2 Sheets-Sheet 1
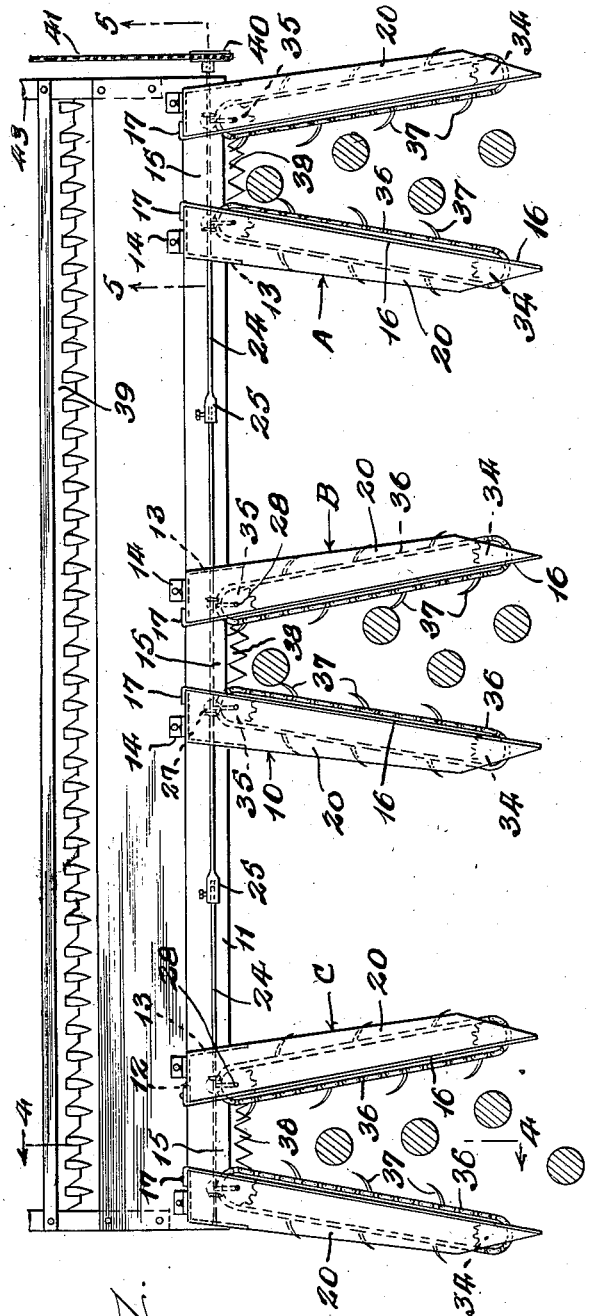
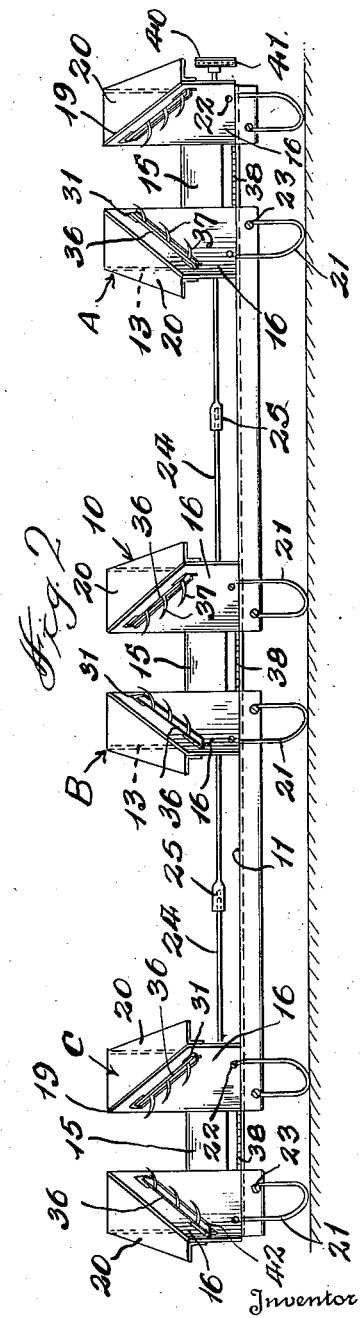
Inventor
John B. Stimatze
By Christian R. Nielsen
Attorney

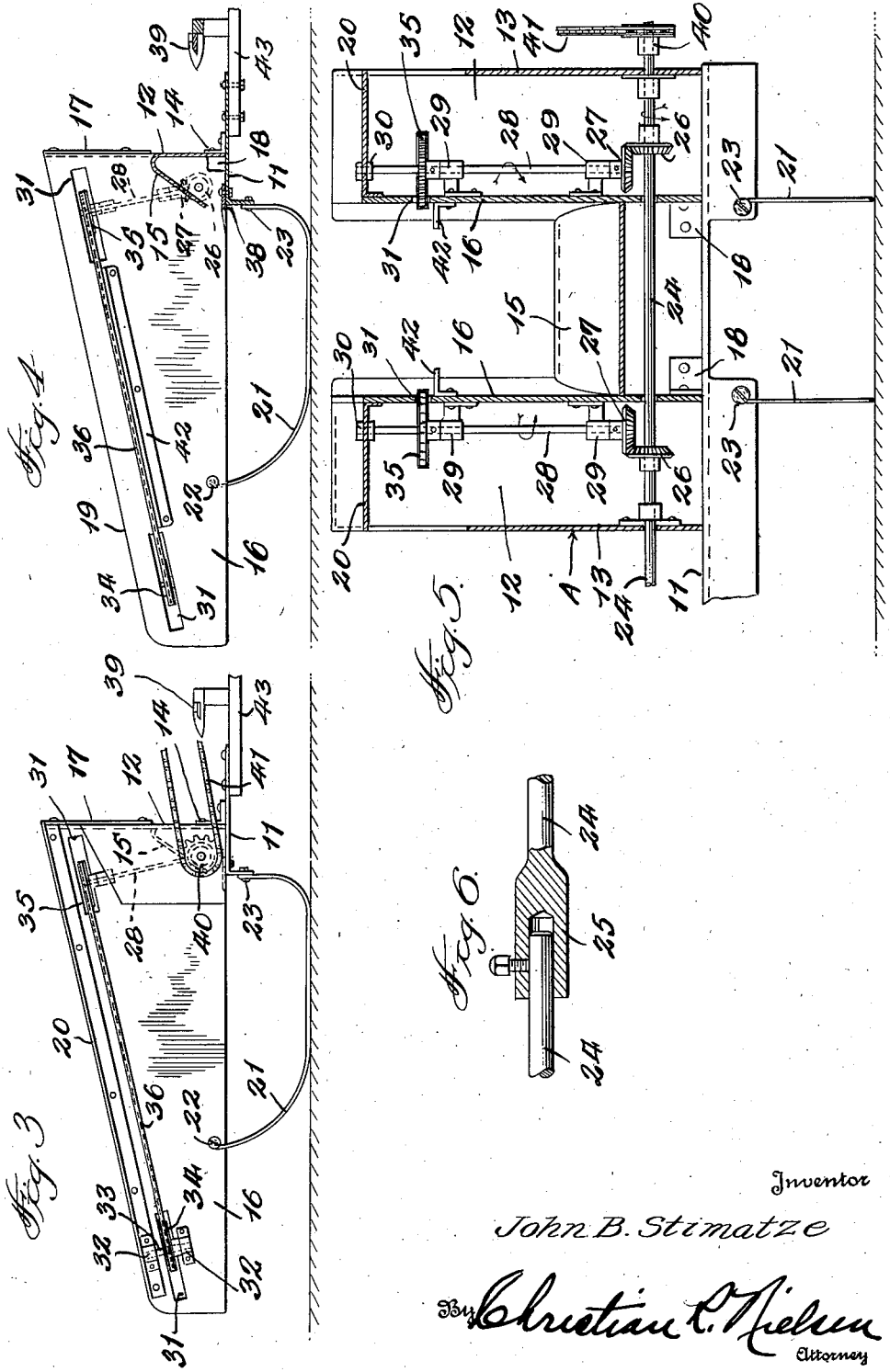

Patented Apr. 7, 1942

2,279,183

UNITED STATES PATENT OFFICE 2,279,183

THREE ROW HARVESTING MACHINE

John B. Stimatze, Syracuse, Kans.

Application March 20, 1941, Serial No. 384,377

5 Claims. (Cl. 56—312)

This invention relates to harvesting machines and it consists in the constructions, arrangements and combinations herein described and claimed.

It is the cardinal object of the invention to provide a harvesting machine unit attachable to standard combines permitting the harvesting of crops planted in rows, such as corn, sugar cane and the like.

It is also an object of the invention to provide a novel drive for crop-gathering means of the unit, the power being obtained from the reel shaft of a combine.

Additional objects, advantages and features of invention will be apparent from the following description considered in conjunction with the accompanying drawings, wherein Figure 1 is a top plan view of the harvester constructed for cutting vegetation positioned along three rows.

Figure 2 is a front elevation thereof, detached from the combine.

Figure 3 is a side elevation.

Figure 4 is a sectional view on the line 4—4 of Figure 1.

Figure 5 is an enlarged sectional view on the line 5—5 of Figure 1.

Figure 6 is a detailed sectional view of the shaft coupling between the units.

Attention is first invited to Figure 1 of the drawings, wherein there is illustrated a three-row harvester 10, although this number is not arbitrary, since more or less units may be employed, as found desirable.

A bed or mounting plate 11 is provided of a length and weight to support the harvesting units A, B and C, and preferably the plate is in the form of an angle bar. Each unit A, B and C is of identical construction and therefore a description of one will be sufficient for a full understanding of the construction and operation.

Each unit will be mounted upon the platform spaced apart so as to follow the crop rows and includes an upstanding rear wall 12, the end portions of which are bent forwardly at right angles as at 13. The wall 12 is rigidly secured to the mounting plate 11 by angle brackets 14. The medial portion of the plate 12 is cut vertically, inward of the angular portions 13 to approximately one-half the height of the plate 12, permitting the plate to be bent inwardly as at 15, for a purpose as will be presently explained.

A pair of outwardly diverging plates 16 are mounted upon the wall 12, one being positioned on either side of the inturned portion 15 of the wall, each plate having a flange 17 for securement to the wall 12. In addition, the lower portion of the plates 16 are braced and anchored to the wall 12 by angle plates 18.

The diverging plates 16 extend forwardly from the mounting plate 11, and may be of any suitable length, this depending largely upon the crop being harvested, but in practice, it has been found practical to have the plates of approximately 30 inches long. The upper edge 19 of the plates 16 taper toward their forward ends and upon the outer side an angle plate 20 is fixed, as clearly shown in Figure 5.

Each of the plates 16 have a skid or shoe 21 for sliding support of the unit, and in the present instance, this is shown as a section of heavy wire bent at the ends to define eyelets 22 and 23, the eyelet 22 being fixed to the adjacent wall 16 and the other eyelet 23 being secured to the mounting plate 11. The front end of the shoes are suitably shaped to permit ready forward travel of the harvester unit.

Each unit A, B, and C is provided with a crop-gathering mechanism, presently to be described, and each unit must therefore be provided with a suitable drive for the crop-gathering mechanism.

Attention is now invited to Figures 1 and 5 of the drawings for an understanding of the construction and operation of the drive wherein, each unit A, B, and C has a shaft 24 extended through the walls 13 and 16, the shafts being coupled together by means of a socket 25, shown in detail in Figure 6. The shafts 24 are made in sections and coupled, to more readily assemble the mechanism and to also permit the installation of additional harvester units when required.

The shaft 24 of each unit A, B, and C has keyed thereto a bevel gear 26 in mesh with a similar gear 27 fixed to an upwardly, forwardly inclined shaft 28 suitably journalled in bearings 29 fixed to the walls 16, and an upper bearing 30 formed in the angle plate 20. The gears 26 and 27 are so meshed as to cause clockwise rotation of one of the shafts 28, while a counter-clockwise rotation is given the other shaft in order that the gathering mechanism will be given a direction of travel to impinge upon the stalks of the crop to draw them into a cutter bar, to be described.

Each of the plates 16 are provided with a pair of elongated openings 31 extended longitudinally and parallel to the upper edge 19, the openings being spaced adjacent the forward and rear ends of the plate. The slots at the forward ends of the plates 16 are provided with bearings 32 within which there is freely revoluble a shaft 33, the latter extending transversely across the slots 31. A sprocket 34 is keyed or fixed to the shaft 33 and lies within the slots 31. The sprockets 34 and 35 are of such diameter as to lie slightly outward of the wall 16 for a purpose as will presently appear.

A sprocket chain 36 is trained about each pair of sprockets 34 and 35 as clearly shown in Figures 1, 3 and 4, and the chains 36 have gripper fingers 37 fixed to certain links of the chain, presented outwardly therefrom, so that during movement of the chains 36 the fingers will be carried along therewith. Obviously, the fingers will engage the stalks of the row to forcibly engage a cutter bar 38 fixed to the platform 11, the cutter bar 38 being of a non-reciprocating type and positioned medially of respective units so as to properly engage the stalks.

Attention is now directed to Figures 3 and 4 of the drawings, where it will be seen that the cutter bars 38 are positioned at a level lower than the cutter bar 39 of a combine (not shown), this being necessary so that the stalks which are cut may pass beneath the cutter bar 39.

I have illustrated a sprocket 40 upon one end of the shaft 24 driven by a chain 41, the latter being entrained about a suitable gear (not shown) of the reel of the combine motion is thus imparted to the shaft 24 and associated gathering mechanisms.

If found necessary, a supporting plate 42 may be mounted beneath the chains 36 to prevent sagging thereof and insure free movement of the chains.

As shown in Figures 3 and 4, the plate 11 of the harvester unit 10 is bolted to a forward extension of a combine indicated generally at 43 and in use, when the combine moves forwardly the harvester unit will be pushed forwardly in advance thereof, the units A, B and C traversing the crop rows. Motion being imparted to the chains 36, the picker fingers will engage stalks in the rows, and draw them into engagement with the cutter bar 38 where they will be severed. The forwardly inclined plate 15 will tend to direct the cut stalks in the direction of the combine where they may be gathered by any suitable conveyor means or otherwise.

While I have specifically shown and described my invention, this is by way of illustration only, and I consider as my own all such modifications in structure as fairly fall within the scope of the appended claims.

I claim:

1. In a row crop harvester for attachment to a combine or the like in advance of the forward travel of the combine comprising a plurality of longitudinally spaced harvesting units, a fixed cutter bar for each unit mounted at a level lower than the cutter bar of the combine, stalk-engaging means on each unit and means for driving said stalk-engaging means to force the stalks into engagement with respective cutter bars.

2. In a row crop harvester for attachment to a combine in advance of the forward travel thereof comprising a mounting plate, a plurality of harvesting units on the plate spaced longitudinally thereof, said units comprising rearwardly diverging side plates, stalk-engaging means carried by the diverging plates, said stalk-engaging means comprising chain members movable in a rearward direction and having lateral extended fingers for engaging a stalk to be cut, means for moving the chain, and a cutter bar fixed to the mounting plate between the diverging plates mounted at a level lower than the cutter bar of the combine.

3. The structure of claim 2 in which each of the diverging side plates has a ground engaging skid.

4. In a crop harvester for attachment to a combine in advance of the forward travel thereof comprising a mounting plate, a plurality of harvesting units mounted on the plate spaced longitudinally thereof, each of said units comprising rearwardly diverging side plates, a back wall connected to the side plates and the mounting plate, a forwardly inclined plate between the side plates, a cutter bar fixed to the mounting plate beneath the inclined plate and projected in advance thereof and at a level below that of the cutter bar of the combine, a transverse shaft extended through the side plates of the units at a point above the forward edge of the mounting plate, a bevel gear on the shaft next adjacent the diverging side plates, a rotatable shaft mounted upon the outer faces of the diverging walls, a gear fixed to each of said last named shafts in mesh with the first named gear, a sprocket on each of the last named shafts, a sprocket rotatably mounted upon the forward ends of the diverging plates, a chain trained about aligned sprockets of each of the diverging plates, gripper fingers on each of the chains adapted to engage stalks of a row and means to rotate said transverse shaft.

5. The structure of claim 4 in which the transverse shaft is separably connected between the units.

JOHN B. STIMATZE.